(12) United States Patent
Endo

(10) Patent No.: US 9,182,603 B2
(45) Date of Patent: Nov. 10, 2015

(54) PROJECTOR AND IMAGE DISPLAY SYSTEM

(71) Applicant: SEIKO EPSON CORPORATION, Tokyo (JP)

(72) Inventor: Takashi Endo, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 180 days.

(21) Appl. No.: 13/973,358

(22) Filed: Aug. 22, 2013

(65) Prior Publication Data

US 2014/0071402 A1  Mar. 13, 2014

(30) Foreign Application Priority Data

Sep. 11, 2012 (JP) ................................. 2012-199516

(51) Int. Cl.
H04N 13/04 (2006.01)
G03B 21/20 (2006.01)
G02B 27/22 (2006.01)
G02B 26/00 (2006.01)
H04N 9/31 (2006.01)

(52) U.S. Cl.
CPC ............. *G02B 27/22* (2013.01); *G02B 26/008* (2013.01); *G02B 27/2207* (2013.01); *G02B 27/2264* (2013.01); *G03B 21/2053* (2013.01); *H04N 9/3114* (2013.01); *H04N 9/3182* (2013.01); *H04N 13/0431* (2013.01); *H04N 13/0438* (2013.01); *H04N 13/0459* (2013.01)

(58) Field of Classification Search
CPC ........... H04N 13/0459; H04N 13/0438; G03B 21/2053; G03B 21/202; G03B 21/2026; G03B 21/14

USPC .................................... 353/7, 84, 85; 348/743
See application file for complete search history.

(56) References Cited

U.S. PATENT DOCUMENTS

| 5,706,061 | A | * | 1/1998 | Marshall et al. .............. 348/743 |
| 2008/0018807 | A1 | | 1/2008 | Someya et al. |
| 2010/0208342 | A1 | * | 8/2010 | Olsen ........................... 359/464 |

FOREIGN PATENT DOCUMENTS

| JP | A-2003-102030 | 4/2003 |
| JP | A-2008-26682 | 2/2008 |
| JP | A-2008-252731 | 10/2008 |
| JP | A-2011-82615 | 4/2011 |

* cited by examiner

Primary Examiner — William C Dowling
Assistant Examiner — Ryan Howard
(74) Attorney, Agent, or Firm — Oliff PLC

(57) ABSTRACT

A projector includes a light source that emits light containing first wavelength light and second wavelength light of which light intensity is lower than that of the first wavelength light when the light source is driven at predetermined electric power, a light separation unit that separates the light from the light source into the first and the second wavelength light, an image formation unit that modulates the first wavelength light in accordance with a first image and modulates the second wavelength light in accordance with a second image, a control unit that supplies the light source with first electric power when the first image is formed, whereas supplying the light source with second electric power that is higher than the first electric power when the second image is formed, and a projection unit that projects the first image and the second image.

11 Claims, 8 Drawing Sheets

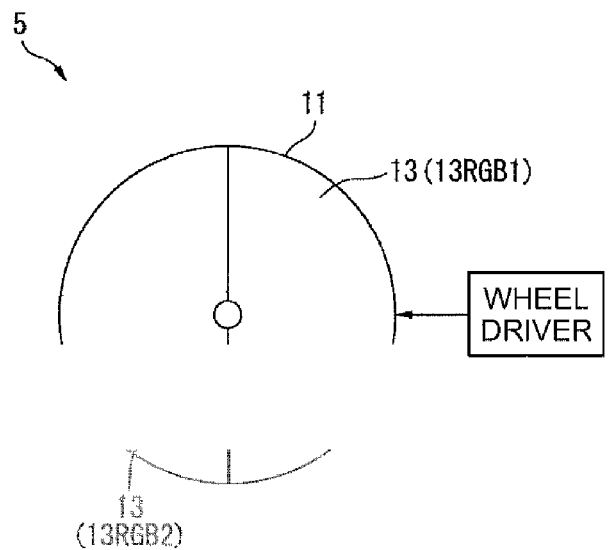
FIG. 4
FIG. 5A
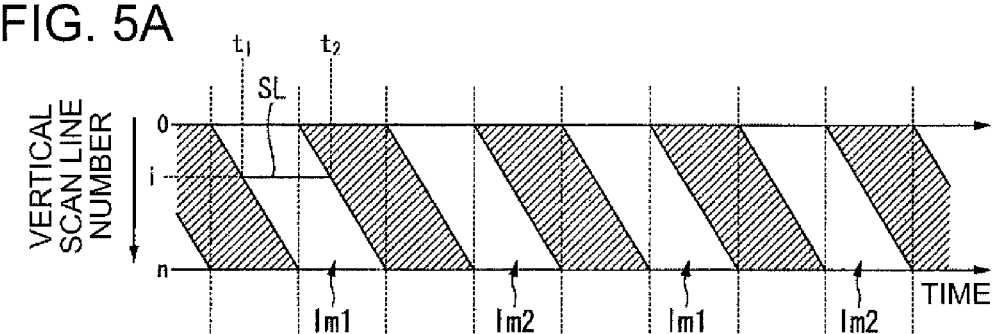
FIG. 5B
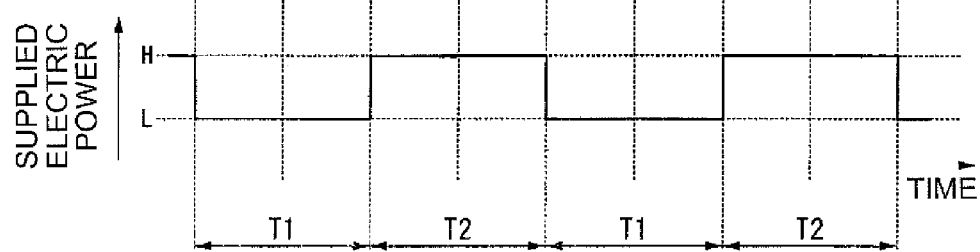

PROJECTOR AND IMAGE DISPLAY SYSTEM

BACKGROUND

1. Technical Field

The present invention relates to a projector and an image display system.

2. Related Art

There has been a known image display system that stereoscopically expresses displayed images (see JP-A-2011-82615, for example). According to the image display system, a user who looks at two images shifted from each other by the amount of parallax between the right and left eyes (image for right eye and image for left eye), what are called parallax images, selectively with the right and left eyes respectively, can visually recognize the displayed images as a stereoscopic image.

As a display method that allows stereoscopic visual recognition of images, a wavelength separation method (anaglyph method) has been known. In the wavelength separation method, two parallax images formed by using wavelengths different from each other are formed on a display screen, separated from each other based on the difference in wavelength, and directed toward the right and left eyes. The display method is carried out by projecting an image for the right eye and an image for the left eye by using a display apparatus, such as the one described in JP-A-2003-102030, and separating the projected images for the right and left eyes with color separation glasses, which then directs the separated images to the right and left eyes. The color separation glasses have a configuration in which a bandpass filter for the left eye blocks the image for the right eye and a bandpass filter for the right eye blocks the image for the left eye.

In the wavelength separation method, it is conceivable that images are naturally displayed, for example, by reducing a difference in tint perceived by the user between an image for the right eye and an image for the left eye. To achieve naturally displayed images, the bandpass filters in the color separation glasses are required to have performance that allows separation of two types of color light fluxes having wavelength different from but close to each other, which imposes a strict restriction on the design of the bandpass filters. It is therefore sometimes difficult to allow the user to perceive that the image for the left eye and the image for the right eye have the same brightness, resulting in a decrease in image display quality.

SUMMARY

An advantage of some aspects of the invention is to provide a projector and an image display system capable of stereoscopic expression of displayed images with high quality.

A first aspect of the invention is directed to a projector that projects a first image for a first viewpoint and a second image for a second viewpoint in a time division manner, the projector including a light source that emits light containing first wavelength light and second wavelength light, the spectrum of the light being configured such that the second wavelength light has a lower light intensity than the first wavelength light when the light source is driven at predetermined electric power, a light separation unit that separates the first wavelength light and the second wavelength light from the light source from each other and allows the first wavelength light and the second wavelength light to exit in a time sequential manner, an image formation unit that modulates the first wavelength light from the light separation unit in accordance with image data on the first image and modulates the second wavelength light from the light separation unit in accordance with image data on the second image at a timing different from the timing at which the first image is formed, a control unit that supplies the light source with first electric power when the light separation unit allows the first wavelength light to exit, whereas supplying the light source with second electric power that is higher than the first electric power when the light separation unit allows the second wavelength light to exit, and a projection unit that projects the first image and the second image formed by the image formation unit.

The projector according to the first aspect forms the first image by using part of light source light emitted from the light source, that is, wavelength light having a relatively high light intensity, and forms the second image by using another part of the light source light, that is, wavelength light having a relatively low light intensity by using increased electric power supplied to the light source. In this process, the wavelength light separated from the light source light and having a relatively low light intensity has a greater light intensity increase ratio than that of the wavelength light separated from the light source light and having a relatively high light intensity in the case where the electric power supplied to the light source is increased, which means in the projector that the light intensity increase ratio is greater when the second image is formed. Therefore, in the projector, the brightness of the second image can be made close to the brightness of the first image by increasing the electric power supplied to the light source while preventing the color balance of the second image from deteriorating. As a result, the projector can stereoscopically express displayed images with high quality.

The projector according to the first aspect may be configured such that the spectrum of the light source has a plurality of peak wavelengths where the light intensity has local maximums, and the first wavelength light is light having a wavelength band containing at least one of the peak wavelengths.

The projector of this configuration can project a bright first image and allows the brightness of the second image to be close to the brightness of the first image.

The projector according to the first aspect may be configured such that the light separation unit includes a first filter that transmits the first wavelength light and blocks the second wavelength light and a second filter that transmits the second wavelength light and blocks the first wavelength light, and transmittance of the second filter at which the second filter transmits the second wavelength light is lower than transmittance of the first filter at which the first filter transmits the first wavelength light.

The projector of this configuration prevents the amount of second wavelength light from being excessive with respect to the amount of first wavelength light when the electric power supplied to the light source is increased.

The projector according to the first aspect may be configured such that the light source emits light containing first color light and second color light, the first color light containing the first wavelength light and the second wavelength light, the second color light containing third wavelength light and fourth wavelength light, the spectrum of the light being configured such that the fourth wavelength light has a lower light intensity than the third wavelength light when the light source is driven at the predetermined electric power, the light separation unit separates light containing the first wavelength light and the third wavelength light and light containing the second wavelength light and the fourth wavelength light from the light source from each other and allows the two types of wavelength light to exit in a time sequential manner, the image formation unit further modulates the third wavelength light in accordance with the image data on the first image and modulates the fourth wavelength light in accordance with the image data on the second image, and the image formation unit includes a first light modulator that modulates the first wavelength light and the second wavelength light in a time sequential manner and a second light modulator that modulates the third wavelength light and the fourth wavelength light in a time sequential manner.

In the projector of this configuration, each of the light modulators modulates a plurality of wavelength light fluxes in a time sequential manner, whereby the configuration of the projector can be simplified. Further, in the projector, the first light modulator forms the first image and the second light modulator forms the second image, whereby the control performed by the image formation unit can be simplified.

The projector according to the first aspect may be configured such that the light source emits light containing first color light and second color light, the first color light containing the first wavelength light and the second wavelength light, the second color light containing third wavelength light and fourth wavelength light, the spectrum of the emitted light being configured such that the fourth wavelength light has a lower light intensity than the third wavelength light when the light source is driven at the predetermined electric power, the light separation unit separates the first wavelength light, the second wavelength light, the third wavelength light, and the fourth wavelength light from the light source from each other and allows the four types of wavelength light to exit in a time sequential manner, the image formation unit includes a light modulator that further modulates the third wavelength light in accordance with the image data on the first image, modulates the fourth wavelength light in accordance with the image data on the second image, and modulates the first wavelength light, the second wavelength light, the third wavelength light, and the fourth wavelength light in a time sequential manner, and the control unit supplies the light source with the first electric power when the light separation unit allows the third wavelength light to exit and supplies the light source with the second electric power when the light separation unit allows the fourth wavelength light to exit.

In the projector of this configuration, a single light modulator modulates the first to fourth wavelength light fluxes, whereby the configuration of the projector can be simplified.

The projector according to the first aspect may be configured such that the light source emits light containing first color light and second color light, the first color light containing the first wavelength light and the second wavelength light, the second color light containing third wavelength light and fourth wavelength light, the spectrum of the emitted light being configured such that the fourth wavelength light has a lower light intensity than the third wavelength light when the light source is driven at the predetermined electric power, the light separation unit separates the first wavelength light, the second wavelength light, the third wavelength light, and the fourth wavelength light from the light source from each other and allows the four types of wavelength light to exit in a time sequential manner, the image formation unit includes a light modulator that further modulates the third wavelength light in accordance with the image data on the first image, modulates the fourth wavelength light in accordance with the image data on the second image, and modulates the first wavelength light, the second wavelength light, the third wavelength light, and the fourth wavelength light in a time sequential manner, and the control unit supplies the light source with the first electric power when the light separation unit allows the third wavelength light to exit and supplies the light source with third electric power higher than the first electric power but lower than the second electric power when the light separation unit allows the fourth wavelength light to exit.

In the projector of this configuration, a single light modulator modulates the first to fourth wavelength light fluxes, whereby the configuration of the projector can be simplified.

A second aspect of the invention is directed to an image display system including the projector according to the first aspect and a color filter that separates light from a display screen on which the projector projects images, the separation performed based on the wavelength of light. The color filter includes a first viewpoint filter that blocks the second wavelength light and the fourth wavelength light and transmits the first wavelength light and the third wavelength light and a second viewpoint filter that blocks the first wavelength light and the third wavelength light and transmits the second wavelength light and the fourth wavelength light. The control unit controls the electric power supplied to the light source in such a way that the difference in brightness between the first image having passed through the first viewpoint filter when the light source is driven at the first electric power and the second image having passed through the second viewpoint filter when the light source is driven at the second electric power is smaller than the difference in brightness between the first image having passed through the first viewpoint filter and the second image having passed through the second viewpoint filter when the light source is driven at the predetermined electric power.

In the image display system, in which the projector according to the first aspect projects images, displayed images can be stereoscopically expressed with high quality. Further, since the image display system reduces the difference in brightness between an image formed by the wavelength light fluxes having passed through the first viewpoint filter and an image formed by the wavelength light fluxes having passed through the second viewpoint filter, high-quality images can be expressed.

A third aspect of the invention is directed to an image display system including the projector according to the first aspect and a color filter that separates light from a display screen on which the projector projects images, the separation performed based on the wavelength of light. The color filter includes a first viewpoint filter that blocks the second wavelength light and the fourth wavelength light and transmits the first wavelength light and the third wavelength light and a second viewpoint filter that blocks the first wavelength light and the third wavelength light and transmits the second wavelength light and the fourth wavelength light. The control unit controls the electric power supplied to the light source in such a way that the difference in color balance between the first image having passed through the first viewpoint filter when the light source is driven at the first electric power and the second image having passed through the second viewpoint filter when the light source is driven at the second electric power is smaller than the difference in color balance between the first image having passed through the first viewpoint filter and the second image having passed through the second viewpoint filter when the light source is driven at the predetermined electric power is greater than.

In the image display system, in which the projector according to the first aspect projects images, displayed images can be stereoscopically expressed with high quality. Further, since the image display system reduces the difference in color balance between an image formed by the wavelength light fluxes having passed through the first viewpoint filter and an image formed by the wavelength light fluxes having passed through the second viewpoint filter, high-quality images can be expressed.

BRIEF DESCRIPTION OF THE DRAWINGS

The invention will be described with reference to the accompanying drawings, wherein like numbers reference like elements.

FIG. 4 shows the configuration of a light separation unit.

FIGS. 5A and 5B show image formation timings and a temporal change in the electric power supplied to the light source.

DESCRIPTION OF EXEMPLARY EMBODIMENTS

First Embodiment

Figure 1:
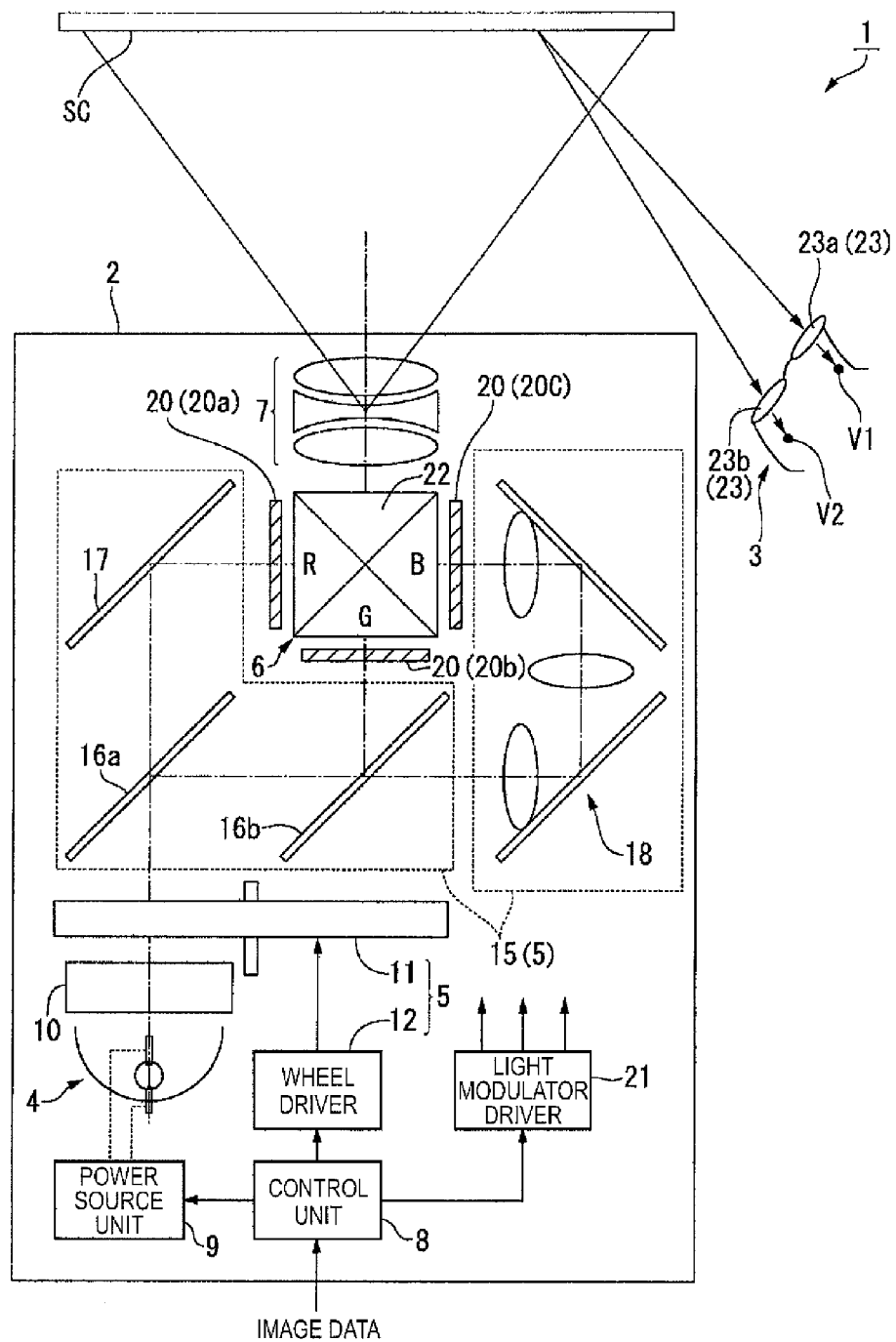
FIG. 1 shows an image display system according to a first embodiment.

A first embodiment will be described. FIG. 1 shows an image display system 1 according to the first embodiment. The image display system 1 is a 3D display system that allows stereoscopic observation (viewing) of images based on the color separation method and includes a projector 2 and color separation glasses 3.

The projector 2 forms images in accordance with image data supplied from a signal source, such as a DVD player and a PC, and projects the formed images on a projection surface SC (display screen), such as a screen or a wall. The signal source and/or the screen may be part of the image display system 1 or may be devices external to the image display system 1.

The projector 2 can switch its display mode between a 2D mode in which images are two-dimensionally expressed and a 3D mode in which images are three-dimensionally expressed. In the 3D mode, the signal source supplies the projector 2 with image data containing information on a pair of parallax images having parallax between the right and left eyes, and the projector 2 projects parallax images according to the image data. Using the pair of parallax images, the projector 2 forms an image for the right eye or a first image for a first viewpoint V1 and subsequently forms an image for the left eye or a second image for a second viewpoint V2 by using light of a wavelength band different from a wavelength band based on which the image for the right eye is formed. The thus formed images for the right and left eyes are alternately projected in a time sequential manner.

The color separation glasses 3, separate the image for the right eye and the image for the left eye from each other based on the difference in the wavelength band, direct the image for the right eye to the right eye of an observer (first viewpoint V1), and direct the image for the left eye to the left eye of the observer (second viewpoint V2). The observer thus observes the pair of parallax images in such a way that the left eye observes substantially only the image for the left eye and the right eye observes substantially only the image for the right eye. The observer can thus perceive the images projected by the projector 2 as a stereoscopic image.

Each of the components of the image display system 1 will next be described in more detail.

The projector 2 shown in FIG. 1 includes a light source 4, a light separation unit 5, an image formation unit 6, a projection unit 7, and a control unit 8. In the projector 2, the light separation unit 5 separates a light flux from the light source 4 (light source light) into light fluxes each having a predetermined wavelength (wavelength light), and the image formation unit 6 modulates the separated wavelength light fluxes to form images. The projection unit 7 is what is called a projection lens and projects the images formed by the image formation unit 6.

The light source light emitted from the light source 4 when a power source unit 9 supplies the light source 4 with electric power contains first color light (red light), second color light (green light), and third color light (blue light). The light source 4 is a lamp light source, such as an ultra-high pressure mercury lamp (UHP). The lamp light source has a sealed gas, such as mercury, excited with the supplied electric power, and emits light when the sealed gas returns from an excited state to a ground state (or quasi-ground state). A peak wavelength where the intensity of the light from the light source 4 has a local maximum is determined in accordance with the composition of the sealed gas and other factors and is, for example, 404.7 nm, 435.8 nm, 546.1 nm, 577.0 nm, and 579.1 nm. The control unit 8 can control voltage and/or current supplied to the light source 4 (supplied electric power) by controlling the power source unit 9. The light source light emitted from the light source 4 has a spectrum that changes when the supplied electric power changes.

Figure 2:
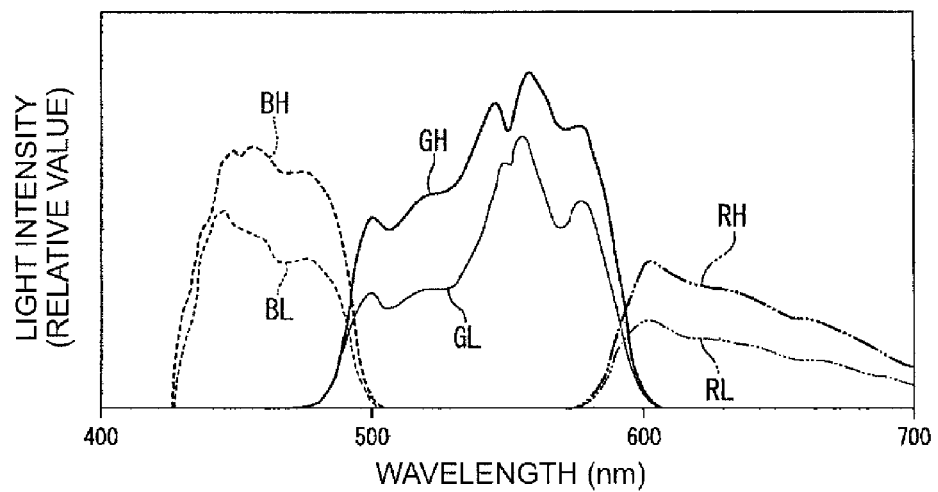
FIG. 2 shows graphs each illustrating that a spectrum changes with electric power supplied to a light source.

FIG. 2 shows graphs each illustrating that the spectrum changes with the electric power supplied to the light source 4. FIG. 2 shows the spectrum (light intensity distribution versus wavelength) of each of the color light fluxes (red light, green light, and blue light) separated from the light source light with a filter for two cases where the supplied electric power is low and high.

The red light, for example, contains light having a wavelength of 700 nm and has a wavelength band longer than or equal to 590 nm but shorter than 780 nm. The green light, for example, contains light having a wavelength of 546.1 nm and has a wavelength band longer than or equal to 500 nm but shorter than 590 nm. The blue light, for example, contains light having a wavelength of 435.8 nm and has a wavelength band longer than or equal to 430 nm but shorter than 500 nm.

In FIG. 2, reference character RH corresponds to red light produced when high electric power is supplied, and reference character RL corresponds to red light produced when low electric power is supplied. Reference character GH corresponds to green light produced when the high electric power is supplied, and reference character GL corresponds to green light produced when the low electric power is supplied. Reference character BH corresponds to blue light produced when the high electric power is supplied, and reference character BL corresponds to blue light produced when the low electric power is supplied. The peak wavelength of each of the color light fluxes produced when the high electric power is supplied is substantially equal to the peak wavelength of the color light flux produced when the low electric power is supplied, but the amount of change in the light intensity from the light intensity produced when the low electric power is supplied to the light intensity produced when the high electric power is supplied varies with the wavelength, as shown in FIG. 2.

Figure 3:
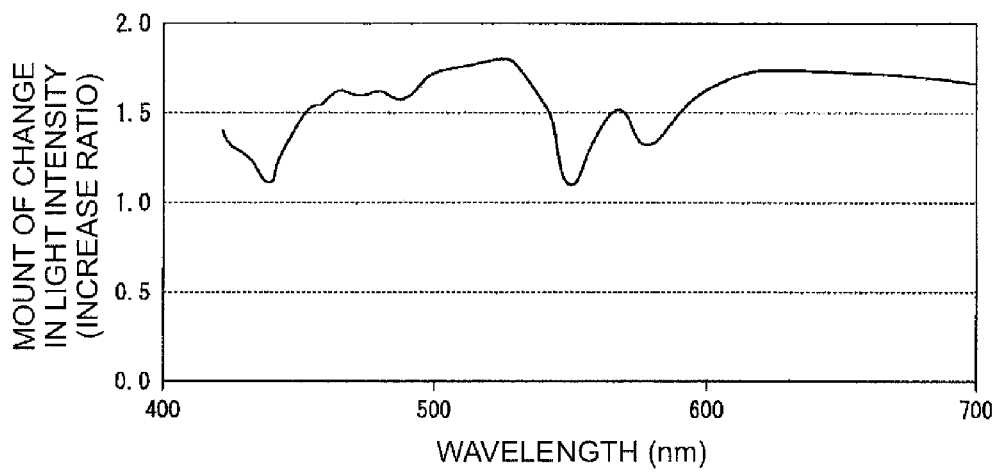
FIG. 3 shows a graph illustrating the amount of change in the light intensity from the light intensity produced when low electric power is supplied to the light intensity produced when high electric power is supplied.

FIG. 3 shows a graph illustrating the amount of change in the light intensity from the light intensity produced when the low electric power is supplied to the light intensity produced when the high electric power is supplied (increase ratio). The light intensity increase ratio tends to have a local minimum in the vicinity of a wavelength roughly equal to the peak wavelength and a local maximum at a wavelength away from the peak wavelength, as shown in FIG. 3. The projector according to the present embodiment is so configured that it can display a high-quality image based on the tendency, and the principle according to which the projector can display a high-quality image will be described later.

Returning to the description with reference to FIG. 1, a homogenizing system 10, which homogenizes the illuminance in the image formation unit 6, is provided in a position where the light source light from the light source 4 is incident. The homogenizing system 10 is formed, for example, of a fly's eye lens, spatially divides the light source light to form a plurality of light source images and superimposes light fluxes from the plurality of light source images on an illuminated area (image formation unit 5). The homogenizing system 10 may alternatively be formed, for example, of a rod integrator that homogenizes the illuminance.

The light separation unit 5 is disposed in a position where the light source light from the light source 4 is incident. The light separation unit 5 separates first wavelength light and second wavelength light from the red light from the light source 4, separates third wavelength light and fourth wavelength light from the green light from the light source 4, and separates fifth wavelength light and sixth wavelength light from the blue light from the light source 4.

The wavelength band of the first wavelength light of the red light is selected from wavelength bands where the light intensity of the first wavelength light is higher than that of the second wavelength light. For example, the first wavelength light is configured to have a wavelength band that contains the peak wavelength of the red light, and the second wavelength light is configured to have a wavelength band that does not contain the peak wavelength of the red light. The wavelength band of the third wavelength light of the green light is selected from wavelength bands where the light intensity of the third wavelength light is higher than that of the fourth wavelength light. For example, the third wavelength light is configured to have a wavelength band that contains the peak wavelength of the green light, and the fourth wavelength light is configured to have a wavelength band that does not contain the peak wavelength of the green light. The wavelength band of the fifth wavelength light of the blue light is selected from wavelength bands where the light intensity of the fifth wavelength light is higher than that of the sixth wavelength light. For example, the fifth wavelength light is configured to have a wavelength band that contains the peak wavelength of the blue light, and the sixth wavelength light is configured to have a wavelength band that does not contain the peak wavelength of the blue light.

FIG. 4 shows the light separation unit 5. The light separation unit 5 in FIG. 4 is formed of what is called a color wheel that includes a rotary wheel 11, which is rotatable around a predetermined axis, and a wheel driver 12, which rotates the rotary wheel 11. The rotary wheel 11 is provided with a plurality of filters 13 arranged in the circumferential direction around the predetermined axis. The plurality of filters 13 are disposed in positions where the light source light from the light source 4 is incident. Each of the plurality of filters 13 transmits a predetermined wavelength light flux of the light source light and blocks (absorbs) the other wavelength light fluxes. The wavelength band of the wavelength light flux that passes through each of the filters 13 differs from those of the wavelength light fluxes that pass through the other filters 13.

In the following description, the plurality of filters 13 are formed of a first filter 13RGB1, which transmits the first wavelength light of the red light (indicated by reference character r1 in FIGS. 6 and 7), the third wavelength light of the green light (indicated by reference character g1 in FIGS. 6 and 7), and the fifth wavelength light of the blue light (indicated by reference character b1 in FIGS. 6 and 7), and a second filter 13RGB2, which transmits the second wavelength light of the red light (indicated by reference character r2 in FIGS. 6 and 7), the fourth wavelength light of the green light (indicated by reference character g2 in FIGS. 6 and 7), and the sixth wavelength light of the blue light (indicated by reference character b2 in FIGS. 6 and 7), and the first and second filters 13RGB1, 13RGB2 are disposed side by side around the predetermined axis.

The wheel driver 12 is formed, for example, of an electric motor and supplies the rotary wheel 11 with a torque around the predetermined axis. The control unit 8 shown in FIG. 1 can control the rotary position of the rotary wheel 11 by controlling the wheel driver 12. When the rotary wheel 11 is rotated, an area on which the light from the light source 4 is incident is switched from one of the filters 13 to the other, whereby the light separation unit 5 alternately outputs light containing the first wavelength light r1, the third wavelength light g1, and the fifth wavelength light b1 and light containing the second wavelength light r2, the fourth wavelength light g2, and the sixth wavelength light b2 in a time sequential manner.

In a position where the wavelength light fluxes from the light separation unit 5 are incident is provided a light guide 15, which guides the wavelength light fluxes to the image formation unit 6, as shown in FIG. 1. The light guide 15 includes, for example, a dichroic mirror 16a, a dichroic mirror 16b, a deflection mirror 17, and a relay system 18.

The dichroic mirror 16a has a characteristic that it transmits the red light (first wavelength light and second wavelength light) and reflects the green light (third wavelength light and fourth wavelength light) and the blue light (fifth wavelength light and sixth wavelength light). The dichroic mirror 16b has a characteristic that it reflects the green light and transmits the blue light. The red light passes through the dichroic mirror 16a, is then reflected off the deflection mirror 17, and reaches the image formation unit 6. The green light is reflected off the dichroic mirror 16a, is then reflected off the dichroic mirror 16b, and reaches the image formation unit 6. The blue light is reflected off the dichroic mirror 16a, passes through the dichroic mirror 16b, and then enters the image formation unit 6 via the relay system 18. The light guide 15, which separates the light source light into the red light, the green light, and the blue light, functions as part of the light separation unit 5.

The projector 2 according to the present embodiment is what is called a three-plate projector and includes three light modulators 20 as the image formation unit 6. The three light modulators 20 include a light modulator 20a, which forms a red image, a light modulator 20b, which forms a green image, and a light modulator 20c, which forms a blue image. The light modulator 20a is disposed in a position where the red light (first wavelength light and second wavelength light) having traveled through the light guide 15 is incident. The light modulator 20b is disposed in a position where the green light (third wavelength light and fourth wavelength light) having traveled through the light guide 15 is incident. The light modulator 20c is disposed in a position where the blue light (fifth wavelength light and sixth wavelength light) having traveled through the light guide 15 is incident.

Each of the three light modulators 20 is formed of a light valve, such as a liquid crystal device or a digital mirror device (DMD). The light modulators 20 are driven by a light modulator driver 21 and modulate the incident wavelength light fluxes having traveled through the light guide 15 in accordance with image data to form color images.

The control unit 8 controls the light modulator driver 21 and the wheel driver 12 in accordance with externally supplied image data to have the light modulators 20 form images at predetermined timings. Further, the control unit 8 controls the electric power supplied to the light source 4 by controlling the power source unit 9 in synchronization with the timings at which the light modulators 20 modulate the wavelength light fluxes.

FIGS. 5A and 5B show image formation timings and a temporal change in the electric power supplied to the light source 4. It is assumed in the description that each of the light modulators 20 forms an image by drawing horizontal scan lines in a line sequential manner. FIG. 5A shows timings at which horizontal scan lines that form an image are drawn, and FIG. 5B shows a temporal change in the electric power supplied to the light source 4.

In FIG. 5A, the vertical axis corresponds to the vertical scan line number (n), and the horizontal axis corresponds to time. For example, in an image formed based on a full HD format (pixels are arranged in a 1920×1080 format), each vertical scan line is a set (column) of 1080 pixels arranged in the vertical direction, and 1920 vertical scan lines are arranged in the horizontal direction. That is, in a full-HD-format image, the vertical scan line number is an integer from 0 to 1919, and the i-th vertical scan line SL is held, for example, brightly displayed during a period from time t1 to time t2.

Each of the light modulators 20 forms horizontal scan lines that form an image for the right eye Im1, then turns off the horizontal scan lines (displayed in black), and subsequently forms horizontal scan lines that form an image for the left eye Im2. Each of the light modulators 20 thus forms the image for the right eye Im1, which is one of a pair of parallax images, in a first period T1 and forms the image for the left eye Im2, which is the other one of the pair of parallax images, in a second period T2 which follows the first period T1. The first period T1 and the second period T2 are set to be substantially the same in length. For example, when a single stereoscopic image (pair of parallax images) is displayed for a period of 1/60 seconds (60 FPS), each of the first period T1 and the second period T2 is set at about 1/120 seconds.

In FIG. 5B, the vertical axis corresponds to the electric power (voltage) supplied to the light source, and the horizontal axis corresponds to time. It is assumed in the description that the control unit 8 changes the supplied electric power in a binary manner, and reference character H represents high level electric power (second electric power) supplied to the light source 4 in a high electric power supply process, and reference character L represents low level electric power (first electric power) supplied to the light source 4 in a low electric power supply process. The control unit 8 holds the supplied electric power at the low level in the first period T1, where each of the light modulators 20 forms an image for the right eye, and holds the supplied electric power at the high level in the second period T2, where each of the light modulators 20 forms an image for the left eye.

In the light separation unit 5, the control unit 8 controls the wheel driver 12 to rotate the rotary wheel 11 in such a way that the rotary wheel 11 is so positioned that the light from the light source 4 is incident on the first filter 13RGB1 during the first period T1 whereas being incident on the second filter 13RGB2 during the second period T2.

Further, in the image formation unit 6, the control unit 8 modulates the first wavelength light, the third wavelength light, and the fifth wavelength light in the first period T1 in accordance with image data on an image for the right eye and modulates the second wavelength light, the fourth wavelength light, and the sixth wavelength light in the second period T2 in accordance with image data on an image for the left eye. The light modulators 20 thus form an image for the right eye by using the color light fluxes shown in FIG. 2 produced when the low electric power is supplied and form an image for the left eye by using the color light fluxes shown in FIG. 2 produced when the high electric power is supplied.

The light according to images formed by the image formation unit 6 (hereinafter referred to as image light) is guided to the projection unit 7 via a dichroic prism 22, as shows in FIG. 1. The projection unit 7 projects the images formed by the image formation unit 6 on the projection surface SC.

The color separation glasses 3 include color filters 23, which separate the light from the projection surface SC, on which the projector 2 displays images, based on wavelength. The color filters 23 are formed of a filter 23a for the first viewpoint V1 (for right eye) and a filter 23b for the second viewpoint V2 (for left eye).

Figure 6:
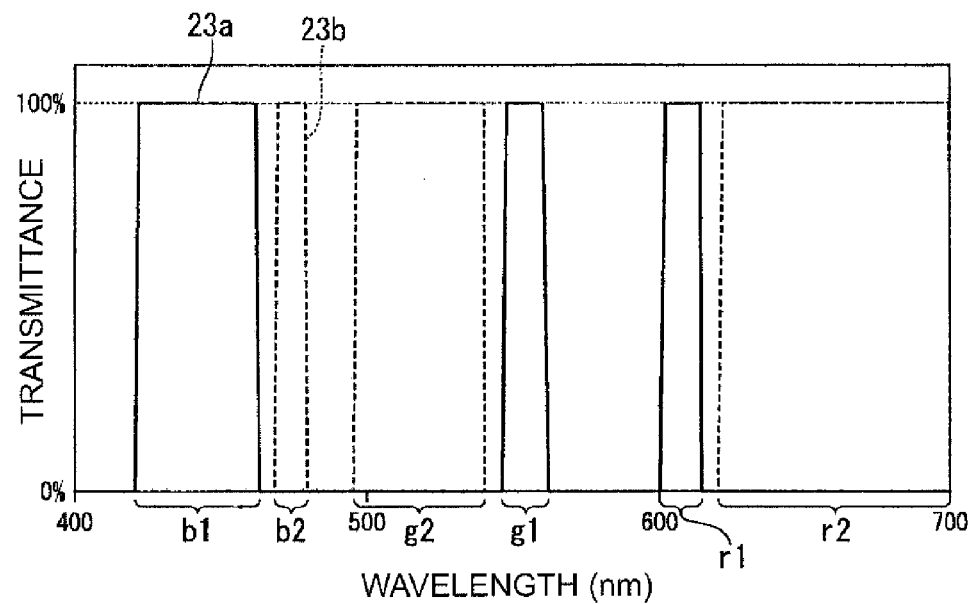
FIG. 6 shows graphs illustrating characteristics of filters in color separation glasses.
Figure 7:
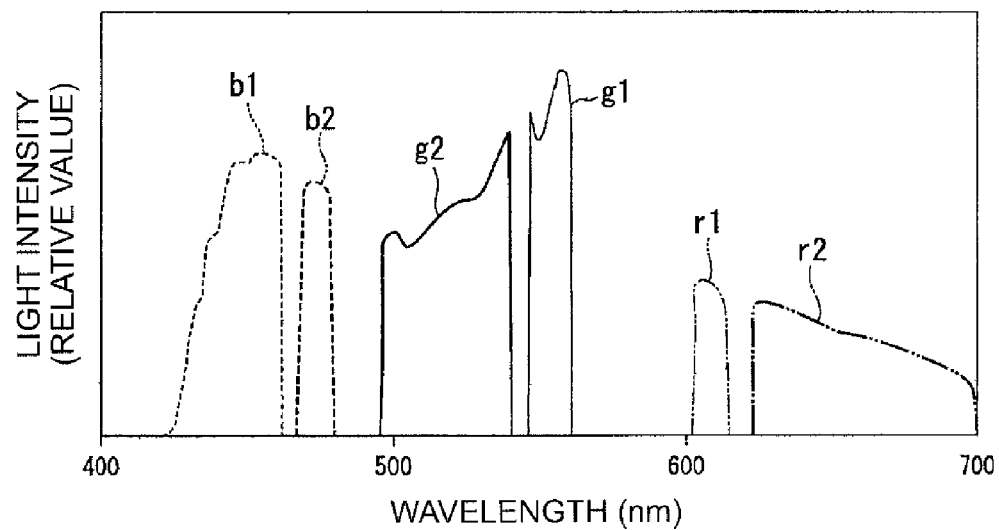
FIG. 7 shows graphs illustrating the spectra of wavelength light fluxes contained in image light having reached viewpoints.

FIG. 6 shows graphs illustrating characteristics of the filters 23a and 23b in the color separation glasses 3. In FIG. 6, the vertical axis represents transmittance of each of the filters, and the horizontal axis represents wavelength. FIG. 7 shows graphs illustrating the spectra of the wavelength light fluxes contained in the image light having reached the viewpoints.

The filter 23a for the right eye has a characteristic that it blocks (absorbs) image light according to an image for the left eye, that is, the second wavelength light r2 of the red light, the fourth wavelength light g2 of the green light, and the sixth wavelength light b2 of the blue light, as shown in FIG. 6. The filter 23a for the right eye has a characteristic that it transmits image light according to an image for the right eye, that is, the first wavelength light r1 of the red light, the third wavelength light g1 of the green light, and the fifth wavelength light b1 of the blue light.

The filter 23b for the left eye has a characteristic opposite to that of the filter 23a for the right eye. That is, the filter 23b for the left eye has a characteristic that it blocks image light according to an image for the right eye, that is, the first wavelength light r1 of the red light, the third wavelength light g1 of the green light, and the fifth wavelength light b1 of the blue light. The filter 23b for the left eye has a characteristic that it transmits image light according to an image for the left eye, that is, the second wavelength light r2 of the red light, the fourth wavelength light g2 of the green light, and the sixth wavelength light b2 of the blue light. The image light (wavelength light fluxes) having exited out of the projector 2 and traveled via the projection surface SC passes through the thus configured color separation glasses 3, whereby the image light is separated and the resultant light fluxes are directed toward the left and right eye of the observer, as shown in FIG. 7.

Figure 8:
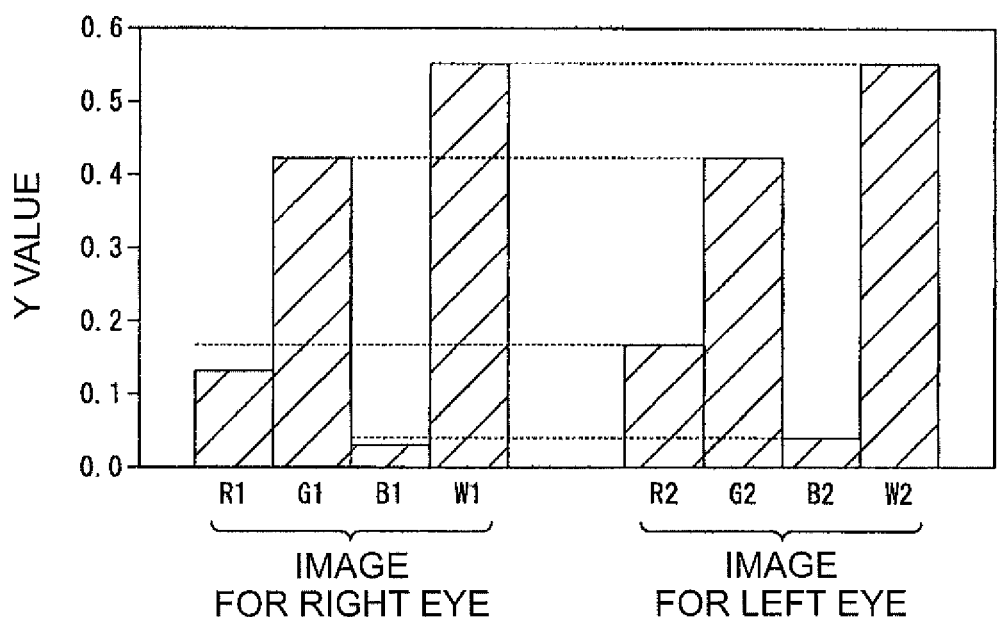
FIG. 8 shows graphs illustrating the color balance and brightness of parallax images.

FIG. 8 shows graphs illustrating the color balance (white balance) and brightness of parallax images. In FIG. 8, the vertical axis represents a Y value, and the horizontal axis represents wavelength. The Y value corresponds to a value obtained by multiplying the luminous efficacy at each wavelength by the light intensity at the wavelength and integrating the resultant value over the wavelength band of each of the wavelength light fluxes and hence represents the brightness perceived by the observer. Reference characters R1, G1, and B1 in FIG. 8 correspond to a red image (image formed by first wavelength light), a green image (image formed by third wavelength light), and a blue image (image formed by fifth wavelength light) respectively that form an image for the right eye, and reference characters R2, G2, and 32 in FIG. 8 correspond to a red image (image formed by second wavelength light), a green image (image formed by fourth wavelength light), and a blue image (image formed by sixth wavelength light) respectively that form an image for the left eye. Further, reference character W1 corresponds to overall brightness of the image for the right eye, and reference character W2 corresponds to overall brightness of the image for the left eye.

A more specific description will be made below. The difference in brightness between the red image R1 having passed through the filter 23a for the first viewpoint V1 and the red image R2 having passed through the filter 23b for the second viewpoint V2 when the light source 4 is driven at predetermined electric power (low-level first electric power, for example) is greater than the difference in brightness between the red image R1 having passed through the filter 23a for the first viewpoint V1 when the light source 4 is driven at the first electric power and the red image R2 having passed through the filter 23b for the second viewpoint V2 when the light source 4 is driven at the high-level second electric power.

The difference in brightness between the green image G1 having passed through the filter 23a for the first viewpoint V1 and the green image G2 having passed through the filter 23b for the second viewpoint V2 when the light source 4 is driven at predetermined electric power (low-level first electric power, for example) is greater than the difference in brightness between the green image G1 having passed through the filter 23a for the first viewpoint V1 when the light source 4 is driven at the first electric power and the green image G2 having passed through the filter 23b for the second viewpoint V2 when the light source 4 is driven at the high-level second electric power. In the present embodiment, the differences are equal to each other.

The difference in brightness between the blue image B1 having passed through the filter 23a for the first viewpoint V1 and the blue image B2 having passed through the filter 23b for the second viewpoint V2 when the light source 4 is driven at predetermined electric power (low-level first electric power, for example) is greater than the difference in brightness between the blue image B1 having passed through the filter 23a for the first viewpoint V1 when the light source 4 is driven at the first electric power and the blue image B2 having passed through the filter 23b for the second viewpoint V2 when the light source 4 is driven at the high-level second electric power.

The difference between the overall brightness W1 of the image for the right eye having passed through the filter 23a for the first viewpoint V1 and the overall brightness W2 of the image for the left eye having passed through the filter 23b for the second viewpoint V2 when the light source 4 is driven at predetermined electric power (low-level first electric power, for example) is greater than the difference between the overall brightness W1 of the image for the right eye having passed through the filter 23a for the first viewpoint V1 when the light source 4 is driven at the first electric power and the overall brightness W2 of the image for the left eye having passed through the filter 23b for the second viewpoint V2 when the light source 4 is driven at the high-level second electric power. In the present embodiment, the differences are equal to each other.

When the difference in brightness of the color light fluxes between an image for the right eye and an image for the left eye is reduced to a smaller value or zero as described above, the difference in the color balance between the image for the right eye having passed through the filter 23a for the first viewpoint V1 and the image for the left eye having passed through the filter 23b for the second viewpoint V2 when the light source 4 is driven at predetermined electric power (low-level first electric power, for example) is greater than the difference in the color balance between the image for the right eye having passed through the filter 23a for the first viewpoint V1 when the light source 4 is driven at the first electric power and the image for the left eye having passed through the filter 23b for the second viewpoint V2 when the light source 4 is driven at the high-level second electric power.

In the present embodiment, an image for the right eye and an image for the left eye are recognized to be of substantially the same brightness, as shown in FIG. 8. In other words, the control unit 8 controls the electric power supplied to the light source 4 in such a way that the brightness of an image for the left eye formed by the wavelength light fluxes having passed through the filter 23b for the left eye is equal to the brightness of an image for the right eye formed by the wavelength light fluxes having passed through the filter 23a for the right eye.

The light intensity increase ratio in a case where the electric power supplied to the light source 4 is increased varies with the wavelength, as described with reference to FIG. 3. Specifically, the light intensity increase ratio for light having a lower light intensity at the time of low supplied electric power tends to be higher when the supplied electric power changes from the low level to the high level.

Consider now a case where an image for the left eye is formed by using the lower-light-intensity wavelength light of the red light (second wavelength light r2) and the higher-light-intensity wavelength light of the green light (third wavelength light g1). In this case, setting the electric power supplied to the light source 4 when the image for the left eye is formed to be greater than the electric power supplied to the light source 4 when an image for the right eye is formed results in a situation in which the increase ratio of the light intensity of the red light is larger than the increase ratio of the light intensity of the green light. It is therefore difficult to make the brightness of the image for the right eye formed when the low electric power is supplied equal to the brightness of the image for the left eye formed when the high electric power is supplied. It is further difficult to make the color balance of the image for the right eye formed when the low electric power is supplied equal to the color balance of the image for the left eye formed when the high electric power is supplied. The inconvenience described above is unlikely to be sufficiently solved based only on the design of the filters in the color separation glasses, and an attempt to do so may cause increases in design cost and manufacture cost of the color separation glasses.

In the present embodiment, the light intensities of the wavelength light fluxes used to form an image for the left eye (second wavelength light r2, fourth wavelength light g2, and sixth wavelength light b2) are lower than the light intensities of the wavelength light fluxes used to form an image for the right eye (first wavelength light r1, third wavelength light g1, and fifth wavelength light b1) when they are compared with each other for each of the colors in the case where the low electric power is supplied. Each of the wavelength light fluxes used to form an image for the left eye (second wavelength light r2, fourth wavelength light g2, and sixth wavelength light b2) therefore has a high light intensity increase ratio in the case where the supplied electric power changes from the low level to the high level, whereby the brightness of the image for the left eye can be readily made close to the brightness of the image for the right eye. Further, when the supplied electric power is changed from the low level to the high level, the increase ratio of the light intensity of each of the wavelength light fluxes used to form an image for the left eye is high, whereby the color balance is maintained when the supplied electric power becomes high. In other words, the control unit 8 controls the electric power supplied to the light source 4 in such a way that the color balance of an image for the left eye formed by the wavelength light fluxes having passed through the filter 23b for the left eye is equal to the color balance of an image for the right eye formed by the wavelength light fluxes having passed through the filter 23a for the right eye.

The projector 2 according to the present embodiment having the configuration described above can make the brightness of an image for the left eye close to the brightness of an image for the right eye by increasing the electric power supplied to the light source 4 while preventing the color balance of the image for the left eye from deteriorating. As a result, the projector 2 can stereoscopically express displayed images with high quality.

Further, in the projector 2, each of the wavelength light fluxes used to form an image for the right eye is light having a wavelength band containing a peak wavelength and hence each of the color light fluxes has a local maximum light intensity, whereby a bright image can be displayed. Since the brightness of an image for the left eye can be made close to the brightness of the image for the right eye, the projector 2 can display a bright, stereoscopic image.

Further, the projector 2 forms an image for the left eye and an image for the right eye for each of the color light fluxes by using the same light modulators. The configuration of the projector can therefore be simplified as compared with a case where an image for the left eye and an image for the right eye are formed by different light modulators. Moreover, since right and left parallax images can be formed by supplying the same light modulators with a signal according to an image for the right eye and a signal according an image for the left eye in a time sequential manner, the control of the light modulators can be simplified.

The image display system 1 according to the present embodiment projects parallax images from the projector 2 described above, whereby displayed images can be stereoscopically expressed with high quality.

The light separation unit 5 in the present embodiment is disposed in a light path between the light guide 15 and the light source 4. The light separation unit 5 may alternatively be disposed in a light path between the light guide 15 and the image formation unit 6. For example, the light separation unit 5 may include a color wheel for the red light that has an area that blocks the first wavelength light of the red light but transmits the second wavelength light of the red light and an area that blocks the second wavelength light but transmits the first wavelength light, and the color wheel may be disposed in a position along the optical path from the light guide 15 to the light modulator that forms a red image. The same configuration may be employed for the green light and the blue light. The amount of loss of light produced at the color wheel can thus be reduced. In the configuration described above as well, the light guide 15 separates the light source light into red light, green light, and blue light and functions as part of the light separation unit 5.

Second Embodiment

A second embodiment will next be described. In the present embodiment, the same components as those in the embodiment described above have the same reference characters as those in the embodiment described above as appropriate, and the description of the same components will be simplified or omitted.

Figure 9:
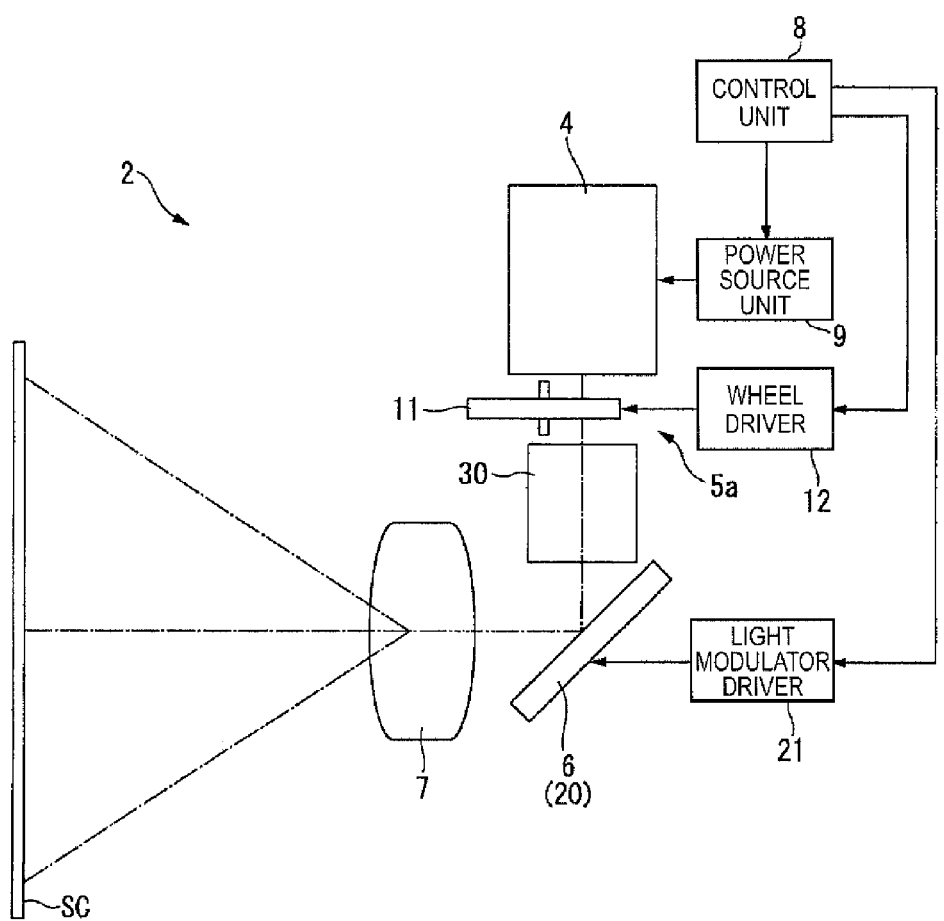
FIG. 9 shows a projector according to a second embodiment.

FIG. 9 shows a projector 2 according to the second embodiment. The projector 2 according to the present embodiment is what is called a projector based on a DLP method (trade name) and uses a single light modulator to form red, green, and blue images that form an image for the left eye and red, green, and blue images that form an image for the right eye in a time sequential manner.

The projector 2 shown in FIG. 9 includes the light source 4, a light separation unit 5a, which is disposed in a position where the light source light from the light source 4 is incident, a rod integrator 30 (homogenizing system), which is disposed in a position where wavelength light fluxes from the light separation unit 5a are incident, a light modulator 20 formed, for example, of a DMD, and the projection unit 7, which projects images formed by the light modulator 20.

Figure 10:
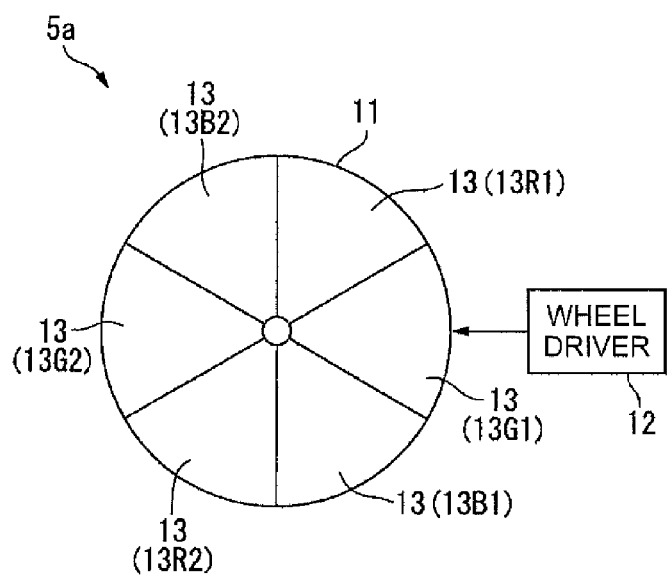
FIG. 10 shows the configuration of a light separation unit in the second embodiment.

FIG. 10 shows the configuration of the light separation unit 5a in the second embodiment. The light separation unit 5a has substantially the same configuration as that of the light separation unit 5 in the first embodiment but differs therefrom in terms of the configuration of the filters 13. The filters 13 in the light separation unit 5a in the present embodiment are formed of a first red filter 13R1 which transmits the first wavelength light r1 of the red light (see FIGS. 6 and 7 for examples of wavelength light fluxes), a first green filter 13G1, which transmits the third wavelength light g1 of the green light, a first blue filter 13B1, which transmits the fifth wavelength light b1 of the blue light, a second red filter 13R2, which transmits the second wavelength light r2 of the red light, a second green filter 13G2, which transmits the fourth wavelength light g2 of the green light, and a second blue filter 13B2, which transmits the sixth wavelength light b2 of the blue light, and the filters are arranged in this order clockwise around a predetermined axis.

Returning to the description with reference to FIG. 9, the wavelength light fluxes having exited out of the light separation unit 5a pass through the rod integrator 30, where the illuminance of the wavelength light fluxes are homogenized, and enters the light modulator 20. The light modulator 20 modulates, for example, the first wavelength light r1, the third wavelength light g1, and the fifth wavelength light b1 in a time sequential manner to form an image for the right eye and subsequently modulates the second wavelength light r2, the fourth wavelength light g2, and the sixth wavelength light b2 in a time sequential manner to form an image for the left eye.

In the first embodiment, when red, green, and blue images are formed to form an image for the left eye, the electric power supplied to the light source 4 for the period during which the light from the light source 4 is incident on the second filter RGB2 is set to be fixed high electric power (second electric power). As a result, in the example shown in FIG. 8, the brightness of an image for the right eye and the brightness of an image for the left eye are equal to each other for green, which provides higher luminous efficacy than those of the other colors in the visible light range, whereas the brightness of the image for the right eye and the brightness of the image for the left eye differ from each other for red and blue.

In the present embodiment, the control unit 8 sets the electric power supplied to the light source 4 when the image formation unit 6 modulates the second wavelength light r2 and the electric power supplied to the light source 4 when the image formation unit 6 modulates the fourth wavelength light g2 to be different from each other so that the image for the left eye formed by the wavelength light fluxes having passed through the filter 23b for the left eye shown in FIG. 1 has predetermined color balance.

Figure 11:
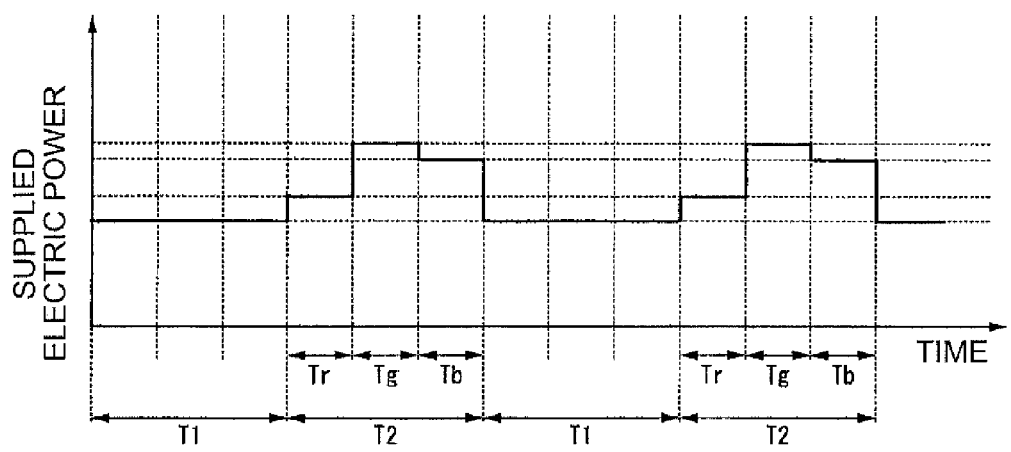
FIG. 11 shows image formation timings and a temporal change in the electric power supplied to the light source.

FIG. 11 shows image formation timings and a temporal change in the electric power supplied to the light source 4. In the example shown in FIG. 8, red and blue are recognized to be brighter in an image for the left eye than in the image for the right eye. To eliminate the differences in brightness, in the example shown in FIG. 11, the electric power is supplied to the light source 4 in the second period T2, where an image for the left eye is formed in the image formation unit 6, as follows: Third electric power is supplied during a period Tr where the second wavelength light r2 of the red light is modulated; the second electric power is supplied during a period Tg where the fourth wavelength light g2 of the green light is modulated; and fourth electric power is supplied during a period Tb where the sixth wavelength light b2 of the blue light is modulated. The third electric power supplied to the light source 4 during the period Tr and the fourth electric power supplied to the light source 4 during the period Tb are higher than the first electric power supplied to the light source 4 during the first period T1, where an image for the right eye is formed, but lower than the second electric power supplied to the light source 4 during the period Tg. In the light separation unit 5a, the control unit 8 controls the wheel driver 12 to rotate the rotary wheel 11 in such a way that the rotary wheel 11 is so positioned that the light from the light source 4 is sequentially incident in the first period T1 on the first red filter 13R1, the first green filter 13G1, and the first blue filter 13B1 and the light from the light source 4 is incident in the second period T2 on the second red filter 13R2 during the period Tr, the second green filter 13G2 during the period Tg, and the second blue filter 13B2 during the period Tb.

Figure 12:
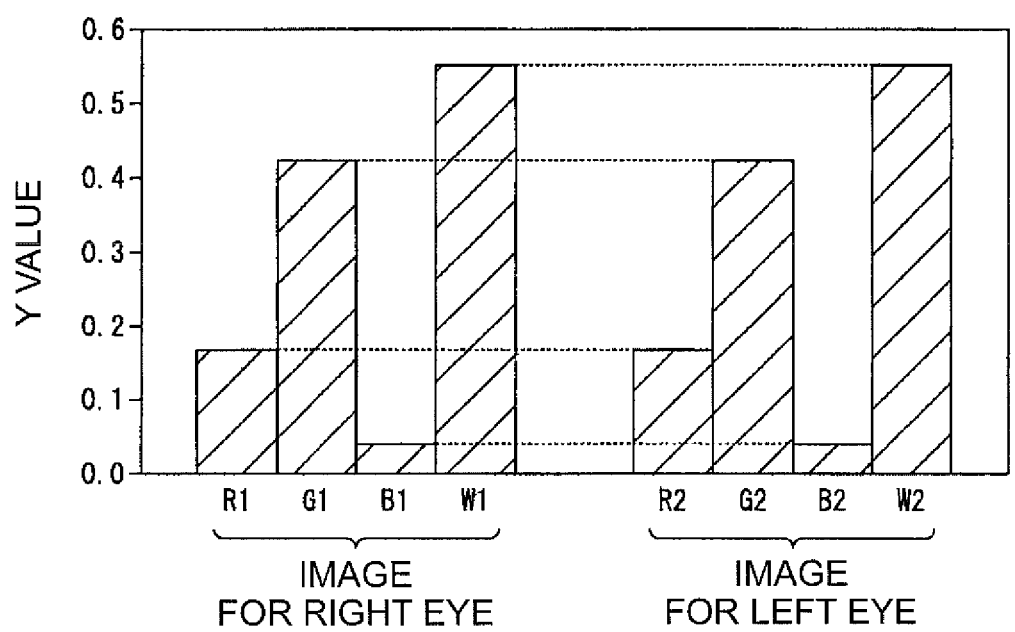
FIG. 12 shows graphs illustrating the color balance and brightness of parallax images.

FIG. 12 shows graphs illustrating the color balance and brightness of parallax images. FIG. 12 will be more specifically described below. The difference in brightness between a red image R1 having passed through the filter 23a for the first viewpoint V1 and a red image R2 having passed through the filter 23b for the second viewpoint V2 when the light source 4 is driven at predetermined electric power (low-level first electric power, for example) is greater than the difference in brightness between the red image R1 having passed through the filter 23a for the first viewpoint V1 when the light source 4 is driven at the first electric power and the red image R2 having passed through the filter 23b for the second viewpoint V2 when the light source 4 is driven at the high-level third electric power. In the present embodiment, the differences are equal to each other.

The difference in brightness between a green image G1 having passed through the filter 23a for the first viewpoint V1 and a green image G2 having passed through the filter 23b for the second viewpoint V2 when the light source 4 is driven at predetermined electric power (low-level first electric power, for example) is greater than the difference in brightness between the green image G1 having passed through the filter 23a for the first viewpoint V1 when the light source 4 is driven at the first electric power and the green image G2 having passed through the filter 23b for the second viewpoint V2 when the light source 4 is driven at the high-level second electric power. In the present embodiment, the differences are equal to each other.

The difference in brightness between a blue image B1 having passed through the filter 23a for the first viewpoint V1 and a blue image B2 having passed through the filter 23b for the second viewpoint V2 when the light source 4 is driven at predetermined electric power (low-level first electric power, for example) is greater than the difference in brightness between the blue image B1 having passed through the filter 23a for the first viewpoint V1 when the light source 4 is driven at the first electric power and the blue image B2 having passed through the filter 23b for the second viewpoint V2 when the light source 4 is driven at the high-level fourth electric power. In the present embodiment, the differences are equal to each other.

The difference between the overall brightness W1 of the image for the right eye having passed through the filter 23a for the first viewpoint V1 and the overall brightness W2 of the image for the left eye having passed through the filter 23b for the second viewpoint V2 when the light source 4 is driven at predetermined electric power (low-level first electric power, for example) is greater than the difference between the overall brightness W1 of the image for the right eye having passed through the filter 23a for the first viewpoint V1 when the light source 4 is driven at the first electric power and the overall brightness W2 of the image for the left eye having passed through the filter 23b for the second viewpoint V2 when the light source 4 is driven at the high-level second electric power, third electric power, and fourth electric power. In the present embodiment, the differences are equal to each other.

When the difference in brightness of the color light fluxes between an image for the right eye and an image for the left eye is reduced to a smaller value or zero as described above, the difference in the color balance between the image for the right eye having passed through the filter 23a for the first viewpoint V1 and the image for the left eye having passed through the filter 23b for the second viewpoint V2 when the light source 4 is driven at predetermined electric power (low-level first electric power, for example) is greater than the difference in the color balance between the image for the right eye having passed through the filter 23a for the first viewpoint V1 when the light source 4 is driven at the first electric power and the image for the left eye having passed through the filter 23b for the second viewpoint V2 when the light source 4 is driven at the high-level second electric power, third electric power, and fourth electric power.

In the present embodiment, predetermined color balance is achieved in each of an image for the right eye and an image for the left eye, and the color balance of the image for the right eye and the color balance of the image for the left eye are equal to each other, as shown in FIG. 12. The projector 2 according to the present embodiment can thus suppress the amount of deterioration in the color balance due to a change in spectrum resulting from an increase in the supplied electric power, whereby a high-quality image can be expressed.

To prevent the amount of any of the color light fluxes from being excessive in parallax images formed when the high electric power is supplied, the characteristics of the filters 13 in the light separation unit 5 can also be adjusted. For example, when the amount of red light (second wavelength light r2) is excessive in parallax images formed when the high electric power is supplied, the transmittance of the filter 13 in the light separation unit 5 that transmits the second wavelength light r2 may be set at a value lower than the transmittance of the filter 13 in the light separation unit 5 that transmits the first wavelength light r1.

The technical range of the invention is not limited to the embodiments described above. The requirements described in the above embodiments can be combined with each other as appropriate. Further, at least one of the requirements described in the above embodiments is omitted in some cases.

A variety of variations are conceivable to the extent that they do not depart from the substance of the invention.

In the embodiments described above, an image for the right eye is formed when the low electric power is supplied and an image for the left eye is formed when the high electric power is supplied. Alternatively, an image for the left eye may be formed when the low electric power is supplied and an image for the right eye may be formed when the high electric power is supplied.

Further, in the embodiments described above, the light source 4, to which the light source unit 9 supplies electric power, emits light source light containing the first color light (red light), the second color light (green light), and the third color light (blue light). Alternatively, the first color light may be green or blue light, the second color light may be red or blue light, and the third color light may be green or red light.

Further, in the embodiments described above, an image for the right eye and an image for the left eye are formed of images formed by the first to third color light fluxes. Alternatively, an image for the right eye and an image for the left eye can be formed of images formed by a single color light flux, two color light fluxes, or four or more color light fluxes.

Further, in the second embodiment described above, the filters 13 in the light separation unit 5a are formed of the first red filter 13R1, the first green filter 13G1, the first blue filter 13B1, the second red filter 13R2, the second green filter 13G2, and the second blue filter 13B2 arranged clockwise in this order around a predetermined axis, but the filters may be arranged in a different order and may have shapes different from each other.

The entire disclosure of Japanese Patent Application No. 2012-199516, filed Sep. 11, 2012 is expressly incorporated by reference herein.

What is claimed is:

1. A projector that projects a first image for a first viewpoint and a second image for a second viewpoint in a time division manner, the projector comprising:
   a light source that emits light containing first wavelength light and second wavelength light, the spectrum of the light being configured such that the second wavelength light has a lower light intensity than the first wavelength light when the light source is driven at predetermined electric power;
   a light separation unit that separates the first wavelength light and the second wavelength light from the light source from each other and allows the first wavelength light and the second wavelength light to exit in a time sequential manner, the light separation unit including a first filter that transmits the first wavelength light and blocks the second wavelength light, and a second filter that transmits the second wavelength light and blocks the first wavelength light;
   an image formation unit that modulates the first wavelength light from the light separation unit in accordance with image data on the first image and modulates the second wavelength light from the light separation unit in accordance with image data on the second image at a timing different from the timing at which the first image is formed;
   a control unit that supplies the light source with first electric power when the light separation unit allows the first wavelength light to exit, whereas supplying the light source with second electric power that is higher than the first electric power when the light separation unit allows the second wavelength light to exit; and
   a projection unit that projects the first image and the second image formed by the image formation unit, and
   a transmittance of the second filter at which the second filter transmits the second wavelength light is lower than a transmittance of the first filter at which the first filter transmits the first wavelength light.

2. The projector according to claim 1,
   wherein the spectrum of the light source has a plurality of peak wavelengths where the light intensity has local maximums, and
   the first wavelength light is light having a wavelength band containing at least one of the peak wavelengths.

3. A projector that projects a first image for a first viewpoint and a second image for a second viewpoint in a time division manner, the projector comprising:
   a light source that emits light containing first wavelength light and second wavelength light, the spec of the light being configured such that the second wavelength light has a lower light intensity than the first wavelength light when the light source is driven at predetermined electric power;
   a light separation unit that separates the first wavelength light and the second wavelength light from the light source from each other and allows the first wavelength light and the second wavelength light to exit in a time sequential manner, the light separation unit including a first filter that transmits the first wavelength light and blocks the second wavelength light, and a second filter that transmits the second wavelength light and blocks the first wavelength light;
   an image formation unit that modulates the first wavelength light from the light separation unit in accordance with image data on the first image and modulates the second wavelength light from the light separation unit in accordance with image data on the second image at a timing different from the timing at which the first image is formed;
   a control unit that supplies the light source with first electric power when the light separation unit allows the first wavelength light to exit, whereas supplying the light source with second electric power that is higher than the first electric power when the light separation unit allows the second wavelength light to exit; and
   a projection unit that projects the first image and the second image formed by the image formation unit,
   the light source emits light containing first color light and second color light, the first color light containing the first wavelength light and the second wavelength light, the second color light containing third wavelength light and fourth wavelength light, the spectrum of the light being configured such that the fourth wavelength light has a lower light intensity than the third wavelength light when the light source is driven at the predetermined electric power,
   the light separation unit separates light containing the first wavelength light and the third wavelength light and light containing the second wavelength light and the fourth wavelength light from the light source from each other and allows the two types of wavelength light to exit in a time sequential manner,
   the image formation unit further modulates the third wavelength light in accordance with the image data on the first image and modulates the fourth wavelength light in accordance with the image data on the second image, and
   the image formation unit includes
      a first light modulator that modulates the first wavelength light and the second wavelength light in a time sequential manner, and a second light modulator that modulates the third wavelength light and the fourth wavelength light in a time sequential manner.

4. An image display system comprising:
the projector according to claim 3, and
a color filter that separates light from a display screen on which the projector projects images, the separation performed based on the wavelength of light,
wherein the color filter includes
a first viewpoint filter that blocks the second wavelength light and the fourth wavelength light and transmits the first wavelength light and the third wavelength light, and
a second viewpoint filter that blocks the first wavelength light and the third wavelength light and transmits the second wavelength light and the fourth wavelength light, and
the control unit controls the electric power supplied to the light source in such a way that the difference in brightness between the first image having passed through the first viewpoint filter when the light source is driven at the first electric power and the second image having passed through the second viewpoint filter when the light source is driven at the second electric power is smaller than the difference in brightness between the first image having passed through the first viewpoint filter and the second image having passed through the second viewpoint filter when the light source is driven at the predetermined electric power.

5. An image display system comprising:
the projector according to claim 3, and
a color filter that separates light from a display screen on which the projector projects images, the separation performed based on the wavelength of light,
wherein the color filter includes
a first viewpoint filter that blocks the second wavelength light and the fourth wavelength light and transmits the first wavelength light and the third wavelength light, and
a second viewpoint filter that blocks the first wavelength light and the third wavelength light and transmits the second wavelength light and the fourth wavelength light, and
the control unit controls the electric power supplied to the light source in such a way that the difference in color balance between the first image having passed through the first viewpoint filter when the light source is driven at the first electric power and the second image having passed through the second viewpoint filter when the light source is driven at the second electric power is smaller than the difference in color balance between the first image having passed through the first viewpoint filter and the second image having passed through the second viewpoint filter when the light source is driven at the predetermined electric power.

6. A projector that projects a first image for a first viewpoint and a second image for a second viewpoint in a time division manner, the projector comprising:
a light source that emits light containing first wavelength light and second wavelength light, the spectrum of the light being configured such that the second wavelength light has a lower light intensity than the first wavelength light when the light source is driven at predetermined electric power;
a light separation unit that separates the first wavelength light and the second wavelength light from the light source from each other and allows the first wavelength light and the second wavelength light to exit in a time sequential manner, the light separation unit including a first filter that transmits the first wavelength light and blocks the second wavelength light, and a second filter that transmits the second wavelength light and blocks the first wavelength light;
an image formation unit that modulates the first wavelength light from the light separation unit in accordance with image data on the first image and modulates the second wavelength light from the light separation unit in accordance with image data on the second image at a timing different from the timing at which the first image is formed;
a control unit that supplies the light source with first electric power when the light separation unit allows the first wavelength light to exit, whereas supplying the light source with second electric power that is higher than the first electric power when the light separation unit allows the second wavelength light to exit; and
a projection nit that projects the first image and the second image formed by the image formation unit,
the light source emits light containing first color light and second color light, the first color light containing the first wavelength light and the second wavelength light, the second color light containing third wavelength light and fourth wavelength light, the spectrum of the emitted light being configured such that the fourth wavelength light has a lower light intensity than the third wavelength light when the light source is driven at the predetermined electric power,
the light separation unit separates the first wavelength light, the second wavelength light, the third wavelength light, and the fourth wavelength from the light source from each other and allows the four types of wavelength light to exit in a time sequential manner,
the image formation unit includes a light modulator that further modulates the third wavelength light in accordance with the image data on the first image, modulates the fourth wavelength light in accordance with the image data on the second image, and modulates the first wavelength light, the second wavelength light, the third wavelength light, and the fourth wavelength light in a time sequential manner, and
the control unit supplies the light source with the first electric power when the light separation unit allows the third wavelength light to exit and supplies the light source with the second electric power when the light separation unit allows the fourth wavelength light to exit.

7. An image display system comprising:
the projector according to claim 6, and
a color filter that separates light from a display screen on which the projector projects images, the separation performed based on the wavelength of light,
wherein the color filter includes
a first viewpoint filter that blocks the second wavelength light and the fourth wavelength light and transmits the first wavelength light and the third wavelength light, and
a second viewpoint filter that blocks the first wavelength light and the third wavelength light and transmits the second wavelength light and the fourth wavelength light, and
the control unit controls the electric power supplied to the light source in such a way that the difference in brightness between the first image having passed through the first viewpoint filter when the light source is driven at the first electric power and the second image having passed through the second viewpoint filter when the light source is driven at the second electric power is smaller than the difference in brightness between the first image having passed through the first viewpoint filter and the second image having passed through the second viewpoint filter when the light source is driven at the predetermined electric power.

8. An image display system comprising:
the projector according to claim 6, and
a color filter that separates light from a display screen on which the projector projects images, the separation performed based on the wavelength of light,
wherein the color filter includes
    a first viewpoint filter that blocks the second wavelength light and the fourth wavelength light and transmits the first wavelength light and the third wavelength light, and
    a second viewpoint filter that blocks the first wavelength light and the third wavelength light and transmits the second wavelength light and the fourth wavelength light, and
the control unit controls the electric power supplied to the light source in such a way that the difference in color balance between the first image having passed through the first viewpoint filter when the light source is driven at the first electric power and the second image having passed through the second viewpoint filter when the light source is driven at the second electric power is smaller than the difference in color balance between the first image having passed through the first viewpoint filter and the second image having passed through the second viewpoint filter when the light source is driven at the predetermined electric power.

9. A projector that projects a first image for a first viewpoint and a second image for a second viewpoint in a time division manner, the projector comprising:
a light source that emits light containing first wavelength light and second wavelength light, the spectrum of the light being configured such that the second wavelength light has a lower light intensity than the first wavelength light when the light source is driven at predetermined electric power;
a light separation unit that separates the first wavelength light and the second wavelength light from the light source from each other and allows the first wavelength light and the second wavelength light to exit in a time sequential manner, the light separation unit including a first filter that transmits the first wavelength light and blocks the second wavelength light, and a second filter that transmits the second wavelength light and blocks the first wavelength light;
an image formation unit that modulates the first wavelength light from the light separation unit in accordance with image data on the first image and modulates the second wavelength light from the light separation unit in accordance with image data on the second image at a timing different from the timing at which the first image is formed;
a control unit that supplies the light source with first electric power when the light separation unit allows the first wavelength light to exit, whereas supplying the light source with second electric power that is higher than the first electric power when the light separation unit allows the second wavelength light to exit; and
a projection unit that projects the first image and the second image formed by the image formation unit, the light source emits light containing first color light and second color light, the first color light containing the first wavelength light and the second wavelength light, the second color light containing third wavelength light and fourth wavelength light, the spectrum of the emitted light being configured such that the fourth wavelength light has a lower light intensity than the third wavelength light when the light source is driven at the predetermined electric power,
the light separation unit separates the first wavelength light, the second wavelength light, the third wavelength light, and the fourth wavelength light from the light source from each other and allows the four types of wavelength light to exit in a time sequential manner,
the image formation unit includes a light modulator that further modulates the third wavelength light in accordance with the image data on the first image, modulates the fourth wavelength light in accordance with the image data on the second image, and modulates the first wavelength light, the second wavelength light, the third wavelength light, and the fourth wavelength light in a time sequential manner, and
the control unit supplies the light source with the first electric power when the light separation unit allows the third wavelength light to exit and supplies the light source with third electric power higher than the first electric power but lower than the second electric power when the light separation unit allows the fourth wavelength light to exit.

10. An image display system comprising:
the projector according to claim 9, and
a color filter that separates light from a display screen on which the projector projects images, the separation performed based on the wavelength of light,
wherein the color filter includes
    a first viewpoint filter that blocks the second wavelength light and the fourth wavelength light and transmits the first wavelength light and the third wavelength light, and
    a second viewpoint filter that blocks the first wavelength light and the third wavelength light and transmits the second wavelength light and the fourth wavelength light, and
the control unit controls the electric power supplied to the light source in such a way that the difference in brightness between the first image having passed through the first viewpoint filter when the light source is driven at the first electric power and the second image having passed through the second viewpoint filter when the light source is driven at the second electric power is smaller than the difference in brightness between the first image having passed through the first viewpoint filter and the second image having passed through the second viewpoint filter when the light source is driven at the predetermined electric power.

11. An image display system comprising:
the projector according to claim 9, and
a color filter that separates light from a display screen on which the projector projects images, the separation performed based on the wavelength of light,
wherein the color filter includes
    a first viewpoint filter that blocks the second wavelength light and the fourth wavelength light and transmits the first wavelength light and the third wavelength light, and a second viewpoint filter that blocks the first wavelength light and the third wavelength light and transmits the second wavelength light and the fourth wavelength light, and the control unit controls the electric power supplied to the light source in such a way that the difference in color balance between the first image having passed through the first viewpoint filter when the light source is driven at the first electric power and the second image having passed through the second viewpoint filter when the light source is driven at the second electric power is smaller than the difference in color balance between the first image having passed through the first viewpoint filter and the second image having passed through the second viewpoint filter when the light source is driven at the predetermined electric power.

* * * * *